United States Patent [19]

Sargeant et al.

[11] Patent Number: 5,158,613
[45] Date of Patent: Oct. 27, 1992

[54] CEMENT SLURRY

[75] Inventors: Jon P. Sargeant, Haslum; Oystein Kalvenes, Solheimsvik; Asbjorn Vonheim, Ask, all of Norway

[73] Assignee: Norsk Hydro a.s., Oslo, Norway

[21] Appl. No.: 266,897

[22] Filed: Nov. 3, 1988

[30] Foreign Application Priority Data

Nov. 9, 1987 [NO] Norway .................................. 874653

[51] Int. Cl.$^5$ .................................................. C04B 14/04
[52] U.S. Cl. ............................ 106/737; 106/721; 166/293; 405/266
[58] Field of Search ............... 106/89, 737, 719, 720, 106/721, 803; 166/292, 293, 294; 405/266

[56] References Cited

U.S. PATENT DOCUMENTS

| | | | |
|---|---|---|---|
| 3,145,774 | 8/1964 | Patchen | 106/98 |
| 4,385,935 | 5/1983 | Skjeldal | 106/98 |
| 4,935,060 | 6/1990 | Dingsoyr | 405/266 |

FOREIGN PATENT DOCUMENTS

| | | | |
|---|---|---|---|
| 53-127531 | 11/1978 | Japan | 106/98 |
| 58-199780 | 11/1983 | Japan | 106/98 |
| 2131409 | 6/1984 | United Kingdom | 106/98 |
| 2179933A | 3/1987 | United Kingdom | |

*Primary Examiner*—William R. Dixon, Jr.
*Assistant Examiner*—Anthony J. Green

[57] ABSTRACT

Hydraulic high density cement slurry, especially for cementation of oil/gas-wells. The slurry contains 30–45 weight % microsilica based on the cement weight and water to a density of 1.9–3.5 g/cm$^3$. If desired there can be added dispersant, retarder and weighting agent. Microsilica acts as a fluid-loss preventing agent. The addition of microsilica prevents strength retrogression at temperatures above 120° C. and acts as a mechanical stabilizer for the cement slurries. A method for production of the cement slurry is also described.

4 Claims, 7 Drawing Sheets

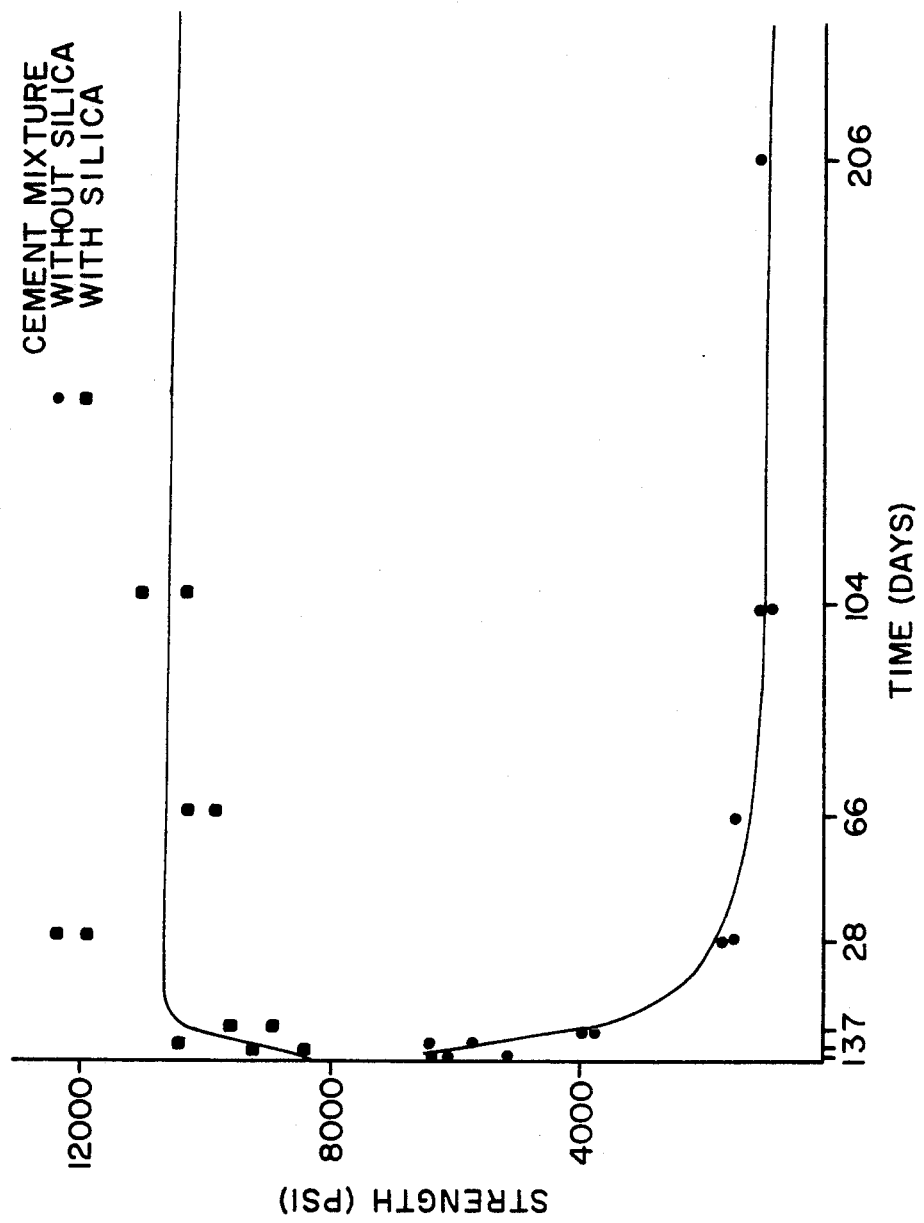

CEMENT SLURRY

The invention concerns a cement slurry and a method for production of a cement slurry for use in cementing of oil/gas-wells for temperatures above 110° C.

In connection with cementing of wells there are still many problems that are not solved in a satisfactory way. When cementing casing against permeable formations fluidloss from the cement slurry to the formation can be a problem (if the filtercake is removed before the cementing process). When this happens at best the risk is that the cement near the formation will have increased permeability with the risk of gas migration, at worst the cementing operation will fail. To prevent this, there exist on the market several organic fluidloss-preventing additives—most often polymers—which in combination with dispersants give slurries with good properties with regard to reduction of filterloss. These cement slurries are often mechanically unstable and tend towards sedimentation. When the speed of sedimentation is high this can give serious problems to the quality of the cement, especially for directional drilling at an high angle where one can risk that the upper part of the casing will remain uncemented. In addition, the additives are very expensive.

For cementation of deep wells with high temperatures, cement with special qualities is required. It must have relative high density ($\rho \geq 1.9$), good rheological qualities, being both mechanically and thermally stable and have high compressive strength.

When cementing oil/gas wells it is common to use Portland-cement.

Hydrated Portland-cement which is exposed to a temperature above 120° C. for a long time, will recrystallize and new phases will exist. This phase transformation involves serious reduction of the strength and an unacceptable increase of the permeability. To counteract this it has been common to use additives of finely crushed silica sand in concentrations of 35–40%. The handling of this sand on the rig is problematic and dangerous to health for the workers, because the sand represents great amounts of fine silica powder material packed in sacks that can cause silicosis. The addition of sand also leads to long curing times and slow strength build up.

It is known from previous publication that silica, in the form of microsilica has been added to oil well cement. Norwegian patent No. 148.995 describes a method for production of a cement slurry and Norwegian patent application No. 853453 describes a hydraulic cement slurry. Both these publications however describe light weight cements and these are normally not used for wells with high temperatures, where there is normally high pressure which necessitates the use of cement slurries with high densities.

The object of the invention thus is to produce a hydraulic cement slurry with normal to high desities (1.9–3.5 g/cm³) which does not give strength retrogression at high temperatures. It also is important to find a cement composition where an increase in permeability at high temperatures is prevented.

Another object is to prevent fluidloss and to obtain a cement with good properties without the use of expensive additives.

The compressive strength of the cement also is important as well as rheology, thickening time etc., It is also essential to have a method for mixing the cement slurry in a simple way on the rig.

These and other objectives of the invention are obtained with the cement slurry, method and use as described below.

A hydraulic cement slurry with normal to high densities (1.9 –3.5 g/cm³) suited for cementation of oil/gas-wells at temperatures >110° C. can be produced based on a standard oilwell cement. To the cement there is added 30–45% microsilica (based on the cement weight) and weighting medium if desired, for example hematite, for cement slurries of the highest densities.

The slurry contains water in an amount of 15–40% based on the amount of solid matter. If desired there can be added dispersant and retarder. The addition of such amounts of microsilica makes it possible to produce cements with good fluidloss qualities *without* having to add fluidloss reducing substances and where strength retrogression is avoided at high temperatures.

To obtain a simple mixing procedure which can be done on the rig it is essential that the microsilica is added as a slurry. To be able to mix such large amounts of microsilica into the cement without flocculation problems, it was found necessary to deviate from the standard API mixing procedure.

Other features of the invention are described more in detail below and are also shown in the FIGS. 1–7, where FIG. 1 shows the measure of density as a function of time.

FIG. 7 shows strength development at 143° C. measured in a press for mixtures with and without silica.

Figure 1:
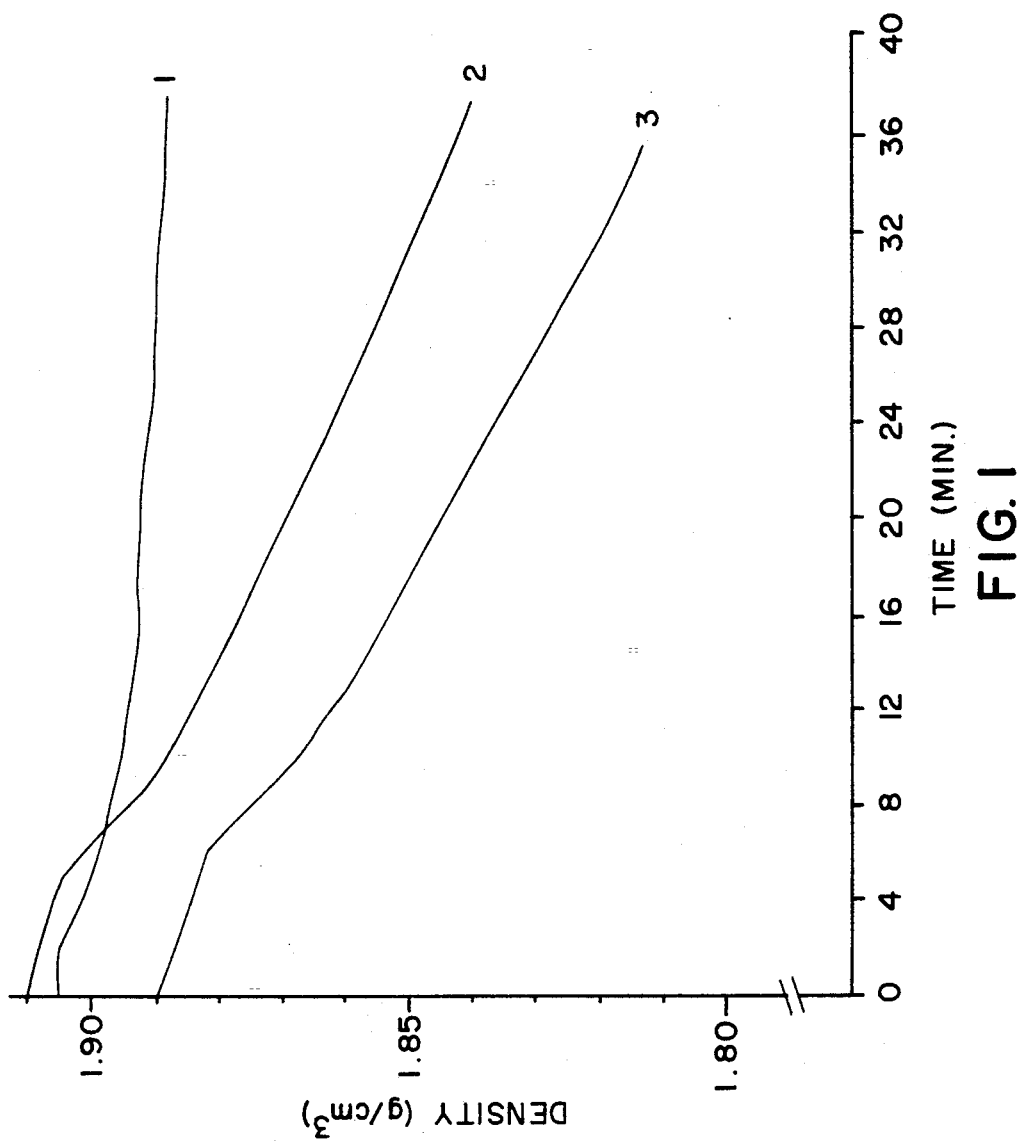

By cementation of oil/gas-wells there is now in use at Norwegian shelf a so-called sulphate resistant G-cement and it has the following chemical composition (demands from the API-specification in brackets).

| | | |
|---|---|---|
| MgO | 1.60% | (5.00% Max) |
| SO₃ | 2.07% | (2.50% Max) |
| Ignition loss | 0.37% | (3.00% Max) |
| Insoluble residue | 0.19% | (0.75% Max) |
| 3 CaO.SiO₂ | 54.4% | (65.00% Max) |
| | | (48.00% Min) |
| 3 CaO.Al₂O₃ | 2.2% | (3.0% Max) |
| 4 CaO.Al₂O₃.Fe₂O₃ + 2.3.CaO.Al₂O₃ | 20.1% | (24.0% Max) |
| Total Alkali Na₂O equivalent | 0.60% | (0.75% Max) |

When Portland cement reacts with water the hydration products C₃S and β-C₂S are essentially the same as by normal temperatures, that is in the range 0°–100° C.

The reaction in principle goes as follows:

$$C_3S + 2H_2O \rightarrow CSH + 2\,Ca(OH)_2 \qquad I$$

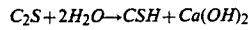

$$C_2S + 2H_2O \rightarrow CSH + Ca(OH)_2 \qquad II$$

But the hydration speed for tricalcium silicate is several times higher than for dicalcium silicate. The reactions are not stoichiometric. The CSH that is formed can have C/S ratios that vary from 1 to more than 1.5 dependent on the reaction conditions. Calcium hydroxides which are formed do crystalline in large well-formed crystals called "Portlandite" and are easily recognized under a microscope.

On the other hand the CSH-phases are more like gel, X-ray amorphous and very difficult to analyse exactly. The most reliable methods are quantitative X-ray diffraction analysis of the crystalline phases and X-ray amorphous phases.

The reaction products are dependent on the reaction rate and of the other ions in the solution, especially alkali. It is the CSH-phases which provide the stable mechanical structure of the formed aggregates in cement and concrete at normal temperatures. The strength and stability in the structure of the end product does increase in principle when the amount of alkali and reaction rate decreases.

There exist a large number of calcium-silicate hydrates which can be formed when cement hydrates. In Table A (taken from Gundlach, M., "Dampgehartete Baustaffe", Bauerverlag GmbH, 1973) there is listed some of the most well known calcium-silicate hydrates which exist in nature.

TABLE A

| Crystalline calcium-silicate hydrates which exist in nature | | | |
|---|---|---|---|
| NO. | NAME | CHEMICAL FORMULA | C/S |
| 1 | Okenite | $CS_2H$ | 0.50 |
| 1 | Nekoite | $C_3S_6H^8$ | 0.50 |
| 2 | Truscottite | $C_6S_{10}H_3$ | 0.60 |
| 3 | Gyrolite | $C_3S_3H_2$ | 0.67 |
| 4-a | Plombierite (14 Å-Tobermorite) | $C_5S_6H_9$ | 0.83 |
| 4-b | 11 Å-Tobermorite | $C_5S_6H_5$ | 0.83 |
| 4-c | Riversideite (9 Å-Tobermorite) | $C_5S_6H_{0-2}$ | 0.83 |
| 5 | Xonotlite | $C_6S_6H$ | 1.00 |
| 6 | Afwillite | $C_3S_2H_3$ | 1.50 |
| 7 | Foshagite | $C_4S_3H$ | 1.67 |
| 8 | Hillebrandite | $C_2SH$ | 2.00 |

In this series of calcium silicate hydrates the ability to build structures with high strength and low permeability varies considerably. The primary phases C—S—H (I) and C—S—H (II) which are formed by low temperatures, are stable up to about 100° C. By this temperature they slowly form crystalline 11 Å Tobermorite. The excess CaO is liberated as crystalline $Ca(OH)_2$ (Portlandite).

These phases have excellent properties regarding high strength, low permeability and shrinkage, and are end products in the most building materials within cement and concrete.

Tobermorite is as such, i.e. when lime and silicic acid are present in such amounts that they correspond to the formula $C_5S_6H_5$, thermodynamically stable in the temperature range 100°-150° C. Above 150° C. the following reactions occur, when the basis is pure components in stoichiometric proportions:

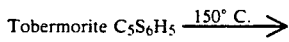

-continued

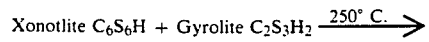

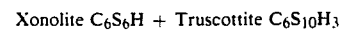

At temperatures of about 500° C., 400° C. respectively these then are transformed to β-Wollastonite and α-Wollastonite. Both Xonatlite and Truscottite have acceptable physical properties regarding strength and permeability and are what one should try to get for cementation at temperatures above 150° C.

If there is an excess of lime, i.e. the C/S ratio is greater than 0.8-1.0, Tobermorite is not durable at temperature above about 100° C. The reaction then taking place is:

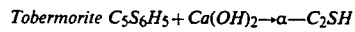

Alpha dicalcium silicate hydrate is formed. This phase has a mechanical strength being about 10% of the strength of Tobermorite. It is this reaction which is the main reason for the strength retrogression of Portland cement at high temperatures. This reaction always takes place at temperatures above about 120° C. when there is an excess of lime. To prevent this type of reactions the excess of lime must be removed by adjusting the C/S-ratio.

This can in practice be done by adding silicic acid $SiO_2$ (silica) to the cement mixture. In the temperature range 110°-150° C. the ideal is C/S=0.83 which corresponds to the Tobermorite composition. Above 150° C. Xonotlite is formed and the C/S ratio for this phase is 1.0. At the different transformation reactions there are formed new crystals. This recrystallisation affects the microstructure and leads to change in strength properties, but it also affects the macrostructure and leads to changes in the permeability. Strength retrogression is often followed by a considerable increase in permeability of the cement. This permeability can make it impossible to isolate different zones in a well from each other, the cement is exposed to chemical attack and the ability to protect the casings from corrosion is lost.

Microsilica is silica dust collected from ferrosilica melting furnaces. The particles are small (on average 0.1-0.2 μm) amorphous particles which are marketed as stable suspensions. Such suspensions also can be produced with conventional dispersants from the cement service companies, but it is also possible to disperse microsilica without dispersant in both acidic and alkaline environments. Theoretically microsilica suspensions have properties which are interesting with regard to the properties of the cement which are desired.

The particle size is interesting with regard to reduction of fluidloss and the mechanical stability of the cement slurry. Several experiments with addition of microsilica to hydraulic cement were therefore performed.

EXPERIMENTAL

It was chosen to concentrate on cement mixtures of densities 1.9-3.5 g/cm³ and addition of 35% microsilica by weight of cement. For the highest densities hematite was added as weighting agent. However, fluidloss experiments were run with varying amounts of added microsilica (15-35%) as well as experiments with up to 44% microsilica. For the mixtures with 35-44% microsilica and $\rho=1.9$ g/cm$^3$ the water content was 31-35% based on the amount of dry matter.

The temperatures which are examined at 50°-70°-90°-120° and 143° C. Strength tests were also carried out at 170° and 210° C. In addition to rheology and thickening time, filterloss, stability, mechanical strength and permeability were examined. A limited number of dispersants and retarders are examined. Accelerators (apart from seawater) and fluidloss preventing agents are not used.

The mixing procedure for cement slurries without addition of microsilica, used in comparative experiments, have been carried out in accordance with API-specification 10.

According to this procedure the water first is poured into the container and thereafter the chemicals are added under stirring (4,000+200 rpm). Finally the cement is added within 15 seconds and the mixing velocity is increased to 12,000+500 rpm in 35 seconds.

For cement mixtures of high density and with large addition of microsilica it is not possible to follow this mixing procedure. It was found that when about 10% of the cement in a mixture based on microsilica and cement with the ratio 35/100 was added to the microsilica/water-mixture, the system flocculated completely (was hard as putty). With continued addition of cement during vigorous stirring, the system did disperse again. However it was found that problems with the flocculation are possible to avoid if about 10% of the cement is added before the microsilica is added and then finally the rest of the cement is added.

Rheology is measured in a Fann-viscometer according to API-specification 10. As the maximum temperature for rheology measurements (not HPHT) is 90° C., the rheology measurements for the cement mixtures made for the temperature range 90°-143° C. were carried out at 90° C.

Fluidloss is measured in a HPHT filtercell according to API-specification 10, but as for the rheology measurements, the fluidloss was measured at a maximum of 90° C.

Thickening time is measured in HPHT consistometer according to API specification 10.

Compressive Strength

Measurement of compressive strength has been carried out according to two methods. The strength has been measured in accordance with API-specification No. 10. The compressive strength then is measured by crushing cement cubes of 2×2" in a press after curing. The compressive strength also has been measured in an "Ultrasonic Cement Analyzer" (UCA). This method gives continous measurements at the actual temperature and pressure, unlike the curing chambers where measurement of compressive strength are single measurements carried out at room temperature (SPE 9283).

Permeability Measurements

Permeability was measured with an air permeameter apparatus (cat. No. 112, Core Laboratory Inc.).

The specific permeability of a core sample can be determined by exposing the sample to a defined gas pressure and there after measuring volumetric flow rate of the gas. The dimension of the permeability is defined as "Darcy". A sample has a permeability of 1 Darcy when an incompressible fluid of viscosity 1 c.P flows with a velocity of 1 cm$^3$/sec. through a cross section area of 1 cm$^2$, with a flow pressure difference of 1 atmosphere. The permeability is calculated after Darcy's law:

$$kg = \frac{C \cdot q_a \cdot L}{A}$$

where
- kg = gas permeability (milidarcy)
- $q_a$ = volume flow velocity for air (cm$^3$/sec)
- L = length of core sample (cm)
- A = area of the cross section for the sample (cm$^2$)
- C = value for the pressure difference between pressure for flow in and pressure for flow out of the sample (considering the air viscosity).

Chemicals

| | |
|---|---|
| EMSAC 460 s | Microsilica slurry. 50% suspension (Elkem, Bremanger Smelteverk), 50,91 l corresponds to 35% addition of microsilica |
| D-31 LN | Dispersant (BJ) |
| Wellsac Q70 | Dispersant (Elkem) |
| D-604 | Dispersant (Dowell) |
| R-12L | Retarder (BJ) |
| D-110 | Retarder (BJ) |
| Gypsum | CaSO$_4$.2H$_2$O (Anchor) |
| Seawater | Accelerator |
| Hematite | Weigthing agent (Halliburton) |
| Steel spheres | Weighting agent (Avesta Nyby Powder AB) |

The tables 1-5 show the results from measurements of rheology, fluidloss, thickening time and compressive strength at 50°, 70°, 90°, 120° and 143° C. for different cement mixtures. The results presented in these tables show that it is possible to produce a cement slurry ($\rho=1.9$ g/cm$^3$) with 35% addition of microsilica which does give acceptable rheology, thickening time, fluidloss, stability and compressive strength in the temperature range 50°-120° C. The yield point (YP) is kept positive also when the plastic viscosity is low and the filterloss qualities at relatively high yield point are most satisfactory (F.L.<100 ml/30 min.). This gives a slurry with stable mechanical properties The thickening time can be varied, at the same time as the short time strength (24 hours) is very high (~10,000 PSI).

Also the results at 143° C. as shown in table 5 shows that fluidloss and thickening times with acceptable values can be obtained with conventional additives Measurement of density versus time as shown in FIG. 1 however shows that the stability of the microsilica mixture 1 is very good compared to the ordinary mixtures 2,3. The composition of these mixtures are shown in table 6. The yield points shown in table 5 confirm this good stability.

TABLE 1

Temperature: 50° C. Composition of the mixture:
100 kg cement, 50.91 l Emsac 400 s + column 2 (l/100 kg cement)

| NO. | COLUMN 2 | RHEOLOGY (Fann) 600-300-200-100 | PV (cPS) | YP (lb/100 ft³) | FLUIDLOSS (ml/30 min) | THICKN. TIME (h:min) | STRENGTH (PSI) TIME (24 HOURS) ½ | 1 | 2 | 4 |
|---|---|---|---|---|---|---|---|---|---|---|
| 1 | Seawater, 7,0 D-31LN | 76,5-40-27,5-15 | 36.5 | 3.5 | 64 | 3:44 | | | 9300 8900 | |
| 2 | Freshwater, 7,0 D-31LN | 64-33,5-22,5-12,5 | 30.5 | 3.0 | 62 | 6:18 | | | 8500 9400 | |
| 3 | Freshwater, 8,0 D-31LN | 71-36-24-13 | 35 | 1.0 | 60 | | | | | |
| 4 | Freshwater, 8,0 Wellsac Q70 | 107-58-40-22,5 | 49 | 9.0 | | | | | | |

TABLE 2

Temperature: 70° C. Composition of the mixture:
100 kg cement, 50,91 l Emsac 460 s + column 2 (l/100 kg cement)

| NO. | COLUMN 2 | RHEOLOGY (Fann) 600-300-200-100 | PV (cPS) | YP (lb/100 ft²) | FLUIDLOSS (ml/300 min) | THICKN. TIME (h:min) | STRENGTH (PSI) TIME (24 HOURS) ½ | 1 | 2 | 4 |
|---|---|---|---|---|---|---|---|---|---|---|
| 1 | Freshwater, 8,0 D-31LN | 72-37-25-13 57-29-20-12 | 35.0 28.0 | 2.0 1.0 | 70 69 | 6:53 | 12000 | 12000 | 14000 | 16000 |
| 2 | Freshwater, 7,0 D-31LN | 53-28-19.5-11 | 25.0 | 3.0 | 70 | 5:00 | | | | |
| 3 | Seawater, 7,0 D-31LN | 64-35-27-12.5 | 29.0 | 6.0 | 88 | 3:34 | | | | |
| 4 | Freshwater, 7,0 D-31LN 0.62 l R-12L | 47-24-16.5-9.5 | 23 | 1.0 | 64 | 6:00+ | | | | |
| 5 | Freshwater, 8.0 Wellsac Q70 | 119-66-47-27 | 53 | 13 | 84 | | | | | |
| 6 | Freshwater, 7.0 D-604 | 97-66.5-57-54.5 | 30.5 | 36 | 75 | 1:37 | | | | |
| 7 | Freshwater, 8.0 D-31LN + Microsilica-powder 35% | 62.5-32-21.6-11 | 30.5 | 1.5 | 70 | | | | | |

TABLE 3

Temperature: 90° C. Composition of the mixture:
100 kg cement, 50,91 l Emsac 460 s + column 2 (l/100 kg cement)

| NO. | COLUMN 2 | RHEOLOGY (Fann) 600-300-200-100 | PV (cPS) | YP (lb/100 ft²) | FLUIDLOSS (ml/30 min) | THICKN. TIME (h:min) | STRENGTH (PSI) TIME (24 HOURS) ½ | 1 | 2 | 4 |
|---|---|---|---|---|---|---|---|---|---|---|
| 1 | Freshwater, 8,0 D-31LN | 53-27-18-10 | 26 | 1 | 78 | 5:10 | | 13000 | | |
| 2 | Freshwater, 8,0 D-31LN 5 kg gypsum | 53.5-28-20-12 | 25.5 | 2.5 | 82 | 4:30 | | 14000 | | |
| 3 | Freshwater, 8,0 D-31LN 0.25 R-15L | | | | | 6:54 | | | | |
| 4 | Freshwater, 8,0 D-31LN 0,5 R-15L | 48,5-25,5-18-10 | 23 | 2.5 | 74 | 6:15+ | | | | |
| 5 | Freshwater, 7,0 D-31LN | 45-27-19-11.5 | 18 | 9 | 84 | 3:40 | | | | |

TABLE 4

Temperature: 120° C. Composition of the mixture:
100 kg cement, 50,91 l Emsac 460 s + column 2 (l/100 kg cement)

| NO. | COLUMN 2 | RHEOLOGY (Fann) 600-300-200-100 | PV (cPS) | YP (lb/100 ft²) | FLUIDLOSS (ml/300 min) | THICKN. TIME (h:min) | STRENGTH (PSI) TIME (24 HOURS) ½ | 1 |
|---|---|---|---|---|---|---|---|---|
| 1 | Freshwater, 8,0 D-31LN 1.78 R-15L | 60.5-36,5-28-19 | 26 | 12.5 | 92 | 3:35 | | 9500 |
| 2 | Freshwater, | 58,5-33-25-11.5 | 25.5 | 7.5 | 94 | 4:05 | | 9000 |

TABLE 4-continued

Temperature: 120° C. Composition of the mixture:
100 kg cement, 50.91 l Emsac 460 s + column 2 (1/100 kg cement)

| NO. | COLUMN 2 | RHEOLOGY (Fann) 600-300-200-100 | PV (cPS) | YP (lb/100 ft²) | FLUIDLOSS (ml/300 min) | THICKN. TIME (h:min) | STRENGTH (PSI) TIME (24 HOURS) ½ | 1 |
|---|---|---|---|---|---|---|---|---|
|   | 8,0 D-31LN |   |   |   |   |   |   |   |
|   | 1.78 R-15L |   |   |   |   |   |   |   |
|   | 5 kg gypsum |   |   |   |   |   |   |   |
| 3 | Freshwater, |   |   |   |   | 3:10 |   |   |
|   | 8,0 D-31LN |   |   |   |   |   |   |   |
|   | 1.69 R-15L |   |   |   |   |   |   |   |
| 4 | Freshwater, | 27-17,5-12-7,5 | 9.5 | 8 | 82 | 6:25 |   |   |
|   | 7,0 D-31LN |   |   |   |   |   |   |   |
|   | 1,39 D-110 |   |   |   |   |   |   |   |

TABLE 5

TEMPERATURE: 143° C. Composition of the mixtures:
100 kg cement, 50,91 l Emsac 460 s + column 2 (1/100 kg cement)

| NO. | COLUMN 2 | RHEOLOGY (Fann) 600-300-200-100 | PV (cPS) | YP (lb/ 100 ft³) | FLUIDLOSS (ml/30 min) | THICKN. TIME (h:min) | STRENGTH (PSI) TIME (24 HOURS) | | | | | |
|---|---|---|---|---|---|---|---|---|---|---|---|---|
|   |   |   |   |   |   |   | ½ | 1 | 2 | 4 | 6 | 8 |
| 1 | Freshwater, 7.0 D-31LN 1.78 D-110 | 25-11-8-4 | 14 | −3 | 70 | 4:03 | 1200 | 2400 | 4000 | 5800 | 11200 10600 | 14500 |
| 2 | Freshwater, 7.0 D-31LN 1.78 D-110, 5 kg gips | 28-13,5-9-5 | 14.5 | −1 | 71 | 3:55 | 2700 | 3100 | 4200 | 5300 |   | 11300 |
| 3 | Freshwater, 7.0 D-31LN 1.90 R-15L, 5 kg gypsum |   |   |   |   | 4:35 |   |   |   |   |   |   |
| 4 | Freshwater, 7.0 D-31LN 1.69 D-110 |   |   |   |   | 3:30 |   |   |   |   |   |   |
| 5 | Freshwater, 7.0 D-31LN 1.87 D-110 |   |   |   |   | 4:55 |   |   |   |   |   |   |
| 6 | Freshwater, 5.0 D-31LN 1.78 D-110 | 30,5-14-9,5-5,5 | 16.5 | −2.5 | 86 |   |   |   |   |   |   |   |
| 7 | Freshwater, 3.0 D-31LN 1.78 D-110 | 36-20-15,5-10 | 16 | 4 | 97 |   |   |   |   |   |   |   |
| 8 | Seawater, 7.0 D-31LN 1.78 D-110 | 40-21-15-9 | 19 | 2 | 90 | 3:05 |   |   |   |   |   |   |
| 9 | Freshwater, 8.0 D-31LN | 53-27-18-10 | 26 | 1 | 78 |   |   | 3800 | 5500 6500 | 8000 8200 |   | 11000 |

TABLE 6

Temperature = 25° C.    $\rho = 1.9 \, g/cm^3$

| NO. | COMPOSITION (1/100 kg cement) | pV (cPs) | YP (lbs/100 ft²) |
|---|---|---|---|
| 1 | Cem., Freshwater, 50.91 l Emsac 460 s, 7.0 D-31LN, 1.78 D-110 | 34 | −1 |
| 2 | Cem., Freshwater, 1.78 D-73, 0.27 D-81, 0.89 D-80 | 46 | −5 |
| 3 | Cem., Freshwater, 1.78 D-19LN, 0.80 R-12L | 43 | −9 |

At 143° C. the reaction rate for the system is different and the strength is developed more slowly from ~1200 PSI after 12 hours to over 10,000 PSI after 8 days and nights. To control the thickening time it is necessary to use retarder. The retarder however reduces the liberation of CaO into the cement in such a way that there will be too little free CaO to form those phases that have high strength and low permeability. By adding gypsum which is an accelerator for CaO liberation, this can be partly compensated for, and a doubling of the strength after 12 hours is obtained.

Figure 2:
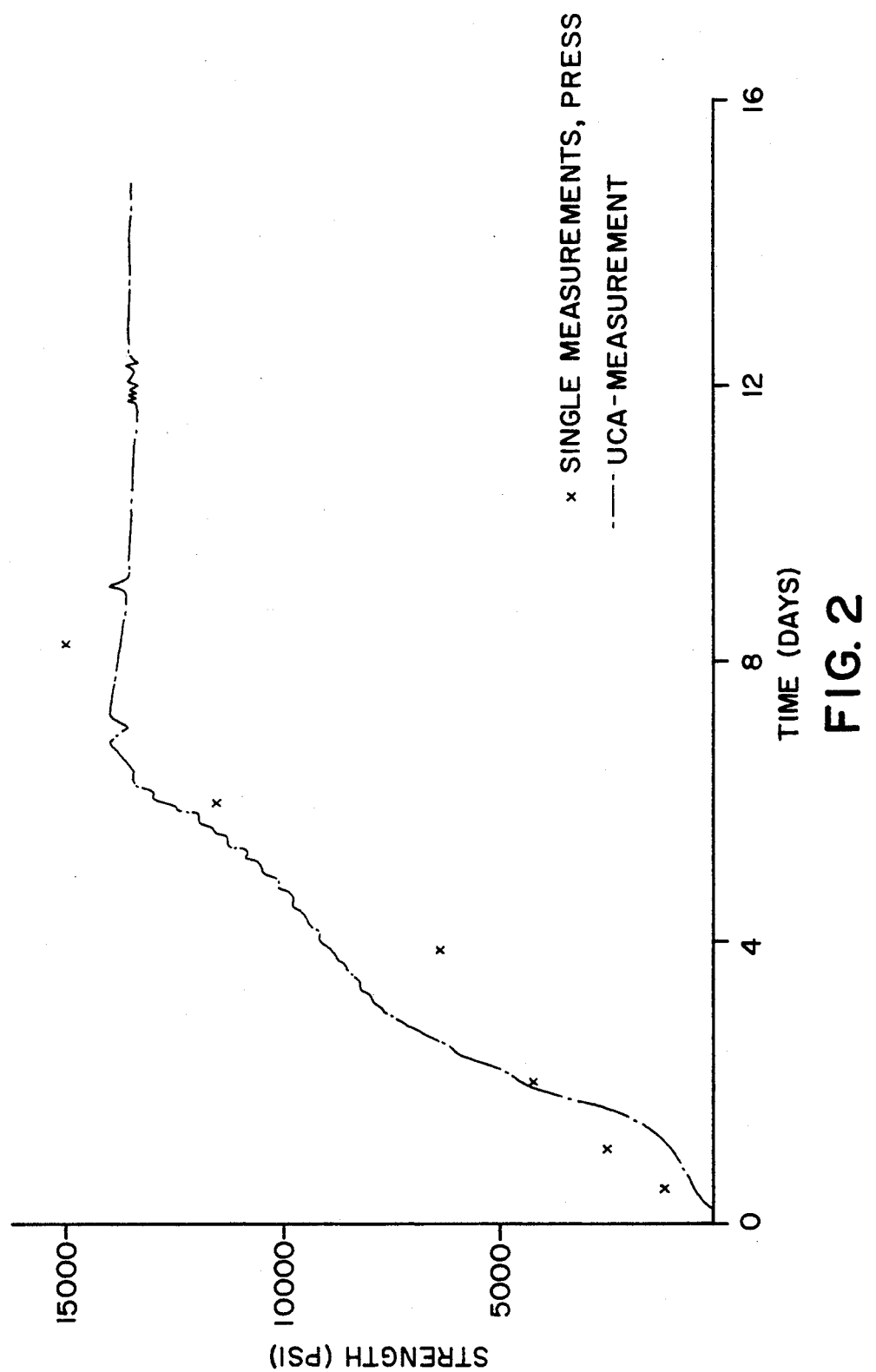
FIG. 2 shows strength development for cement/microsilica mixture with retarder at 143° C., $\rho = 1.9$ g/cm³.
Figure 3:
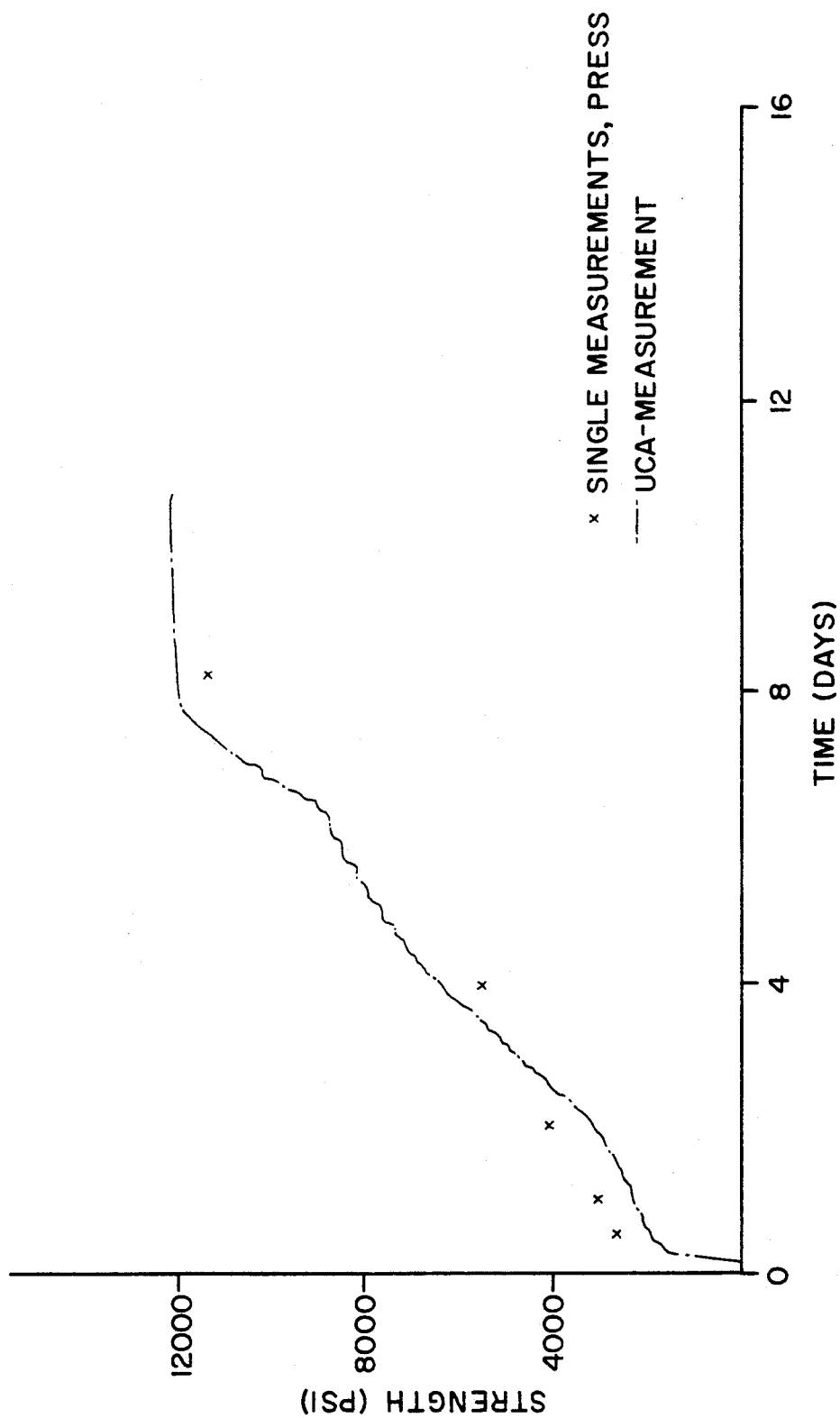
FIG. 3 shows strength development for cement/microsilica mixture with retarder and 5% gypsum at 143° C., $\rho = 1.9$ g/m³.
Figure 4:
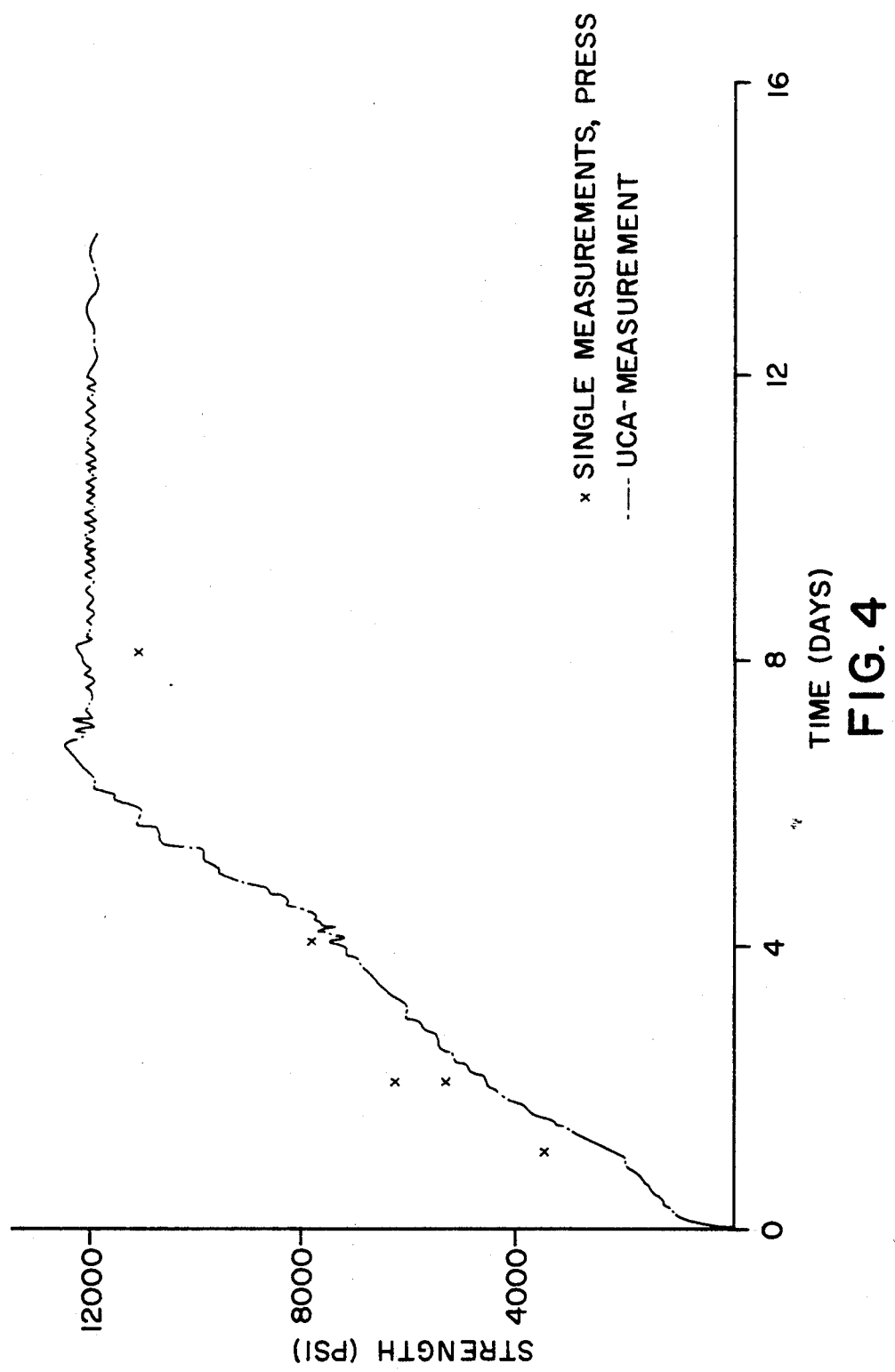
FIG. 4 shows strength development for cement/microsilica mixture without retarder and gypsum at 143° C., $\rho = 1.9$ g/m³.

This is illustrated in FIGS. 2-4 which show the strength development for 35% microsilica/cement-mixtures at 143° C. With respectively retarder, retarder and 5% gypsum and mixtures without both retarder and gypsum, $\rho = 1.9 \, g/cm^3$.

TABLE 7

| | Permeability measurements | | | | | |
|---|---|---|---|---|---|---|
| NO. | COMPOSITION (1/100 kg cement) | TEMP. (°C.) | PERMEABILITY (mD) TIME (24 HOURS) | | | |
| | | | 1 | 2 | 4 | 8 |
| 1 | Cement, Freshwater, 50.91 Emsac 460 s, 8.0 D-31LN, 1.78 R-15L | 120 | 0.02 0.01 m Darcy | | | |
| 2 | Cement, Freshwater, 50.91 Emsac 460 s, 8.0 D-31LN, 1.78 R-15L, 5% gypsum | 120 | 0.02 0.02 | | | |
| 3 | Cement, Freshwater, 50.91 Emsac 460 s, 8.0 D-31LN | 143 | 0.13 0.04 | 0.03 0.02 | 0.02 0.02 | |
| 4 | Cement, Freshwater, 50.91 Emsac 460 s, 7.0 D-31LN, 1.78 D-110 | 143 | 0.03 0.06 | 0.02 0.02 | 0.02 | |
| 5 | Cement, Freshwater, 50.91 Emsac 460 s, 7.0 D-31LN, 1.78 D-110 | 143 | | 0.02 0.06 | 0.02 0.02 | 0.02 |

Precision in the measurements for permeability is 0.01 Darcy

Figure 5:
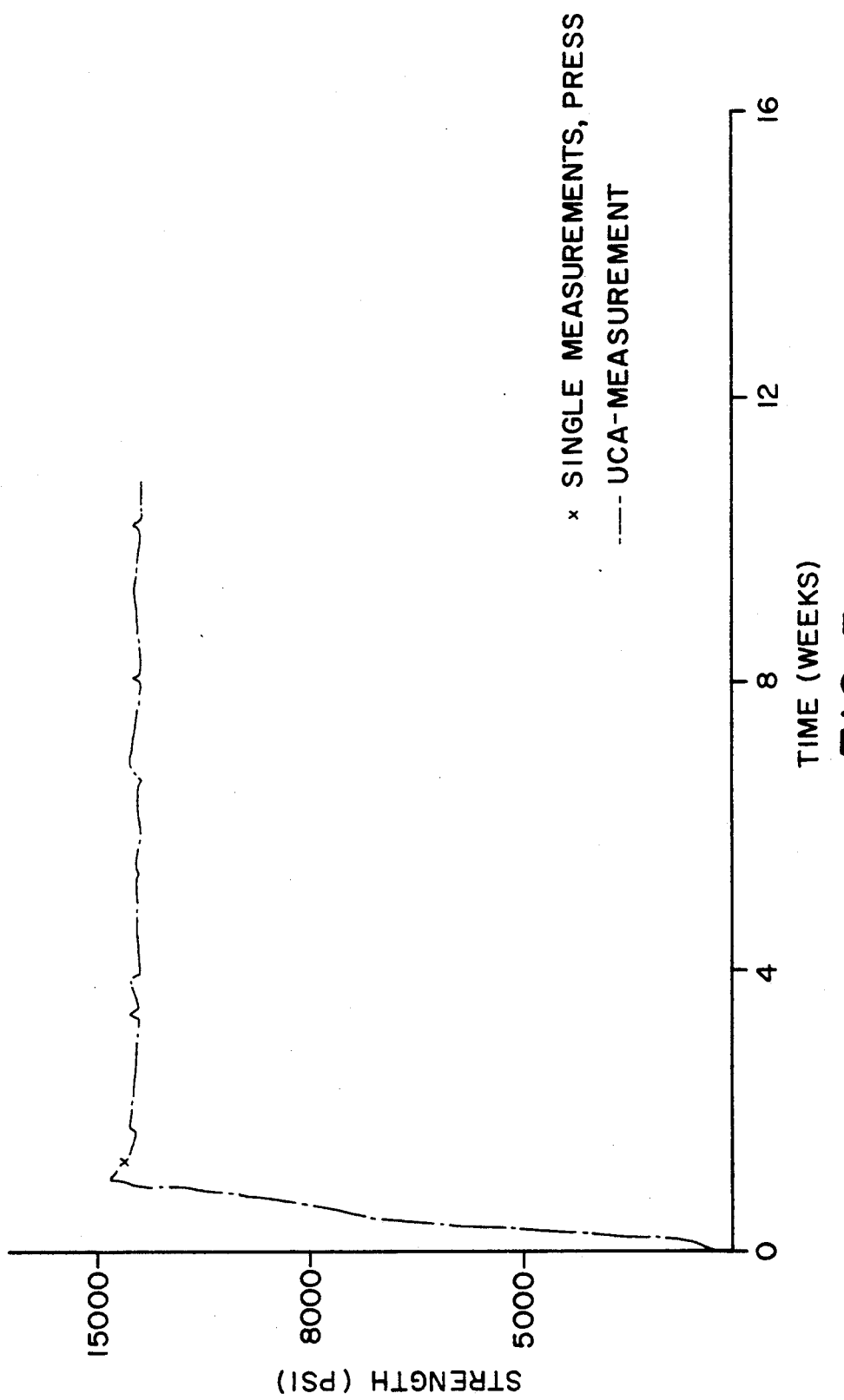
FIG. 5 shows long time strength for cement/microsilica with retarder at 143° C.

In FIG. 5 the strength development for 35% microsilica/cement mixtures with retarder during 12 weeks are shown, and the measurements do not show any strength retrogression.

The strength development increases for 8 days and there is a three-fold increase between day 2 and day 8. In comparison reference can be made to FIG. 7 where the development of strength at 143° C. measured in a press for mixtures with 35% quartz sand and without silica is shown. For mixtures without $SiO_2$ the compressive strength is reduced to 17% of the maximum strength, while addition of 35% $SiO_2$ gives stable strength over the same time period. As can be seen from the FIGS. 5 and 7 the addition of microsilica does give higher compressive strengths than addition of quartz sand. The difference between the compressive strengths is even greater at low temperatures.

In table 7 the permeability of different mixtures at 120° C. and 140° C. are measured. The table shows that after 2 days the permeability is low for all mixtures.

At temperatures above 200° C. truscottite can be formed and the short time strength development then again will be greater than at 143° C. This is illustrated in table 8 which shows the 24 hour strength at 210° C. for 35% microsilica/cement-mixture with retarder and with and without gypsum.

TABLE 8

| | Strength test 210° C. |
|---|---|
| Composition | 24 hours strength (PSI) |
| Mixture No. 1, table 5 | 13000 |
| Mixture No. 2, table 5 (gypsum) | 13000 |

In table 9 it is shown that it is possible to increase the microsilica additive concentration to 44%.

TABLE 9

| 44% addition of microsilica | | | | |
|---|---|---|---|---|
| Temperature: 90° C. | | | | |
| Composition (1/100 kg cement) | Rheology (Fann) 600-300-200-100 | PV cPs | YP lb/100 ft² | Filterloss (ml/30 min) |
| Cement, 44% Microsilica 7.0 D-31LN, 1.78 D-110, 5% gypsum | 40.5-20.5 14.5-9 | 20 | 0.5 | 82 |

Figure 6:
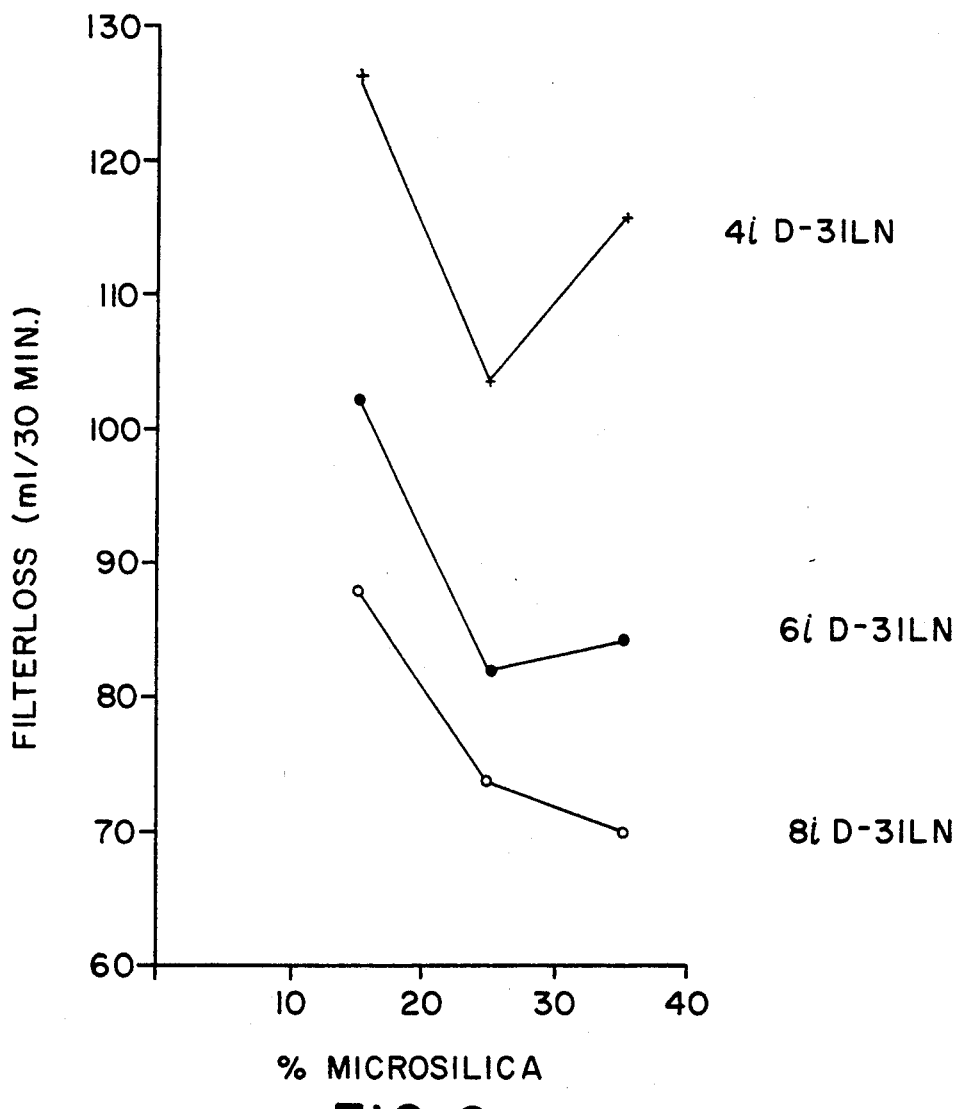
FIG. 6 shows fluidloss as a function of % microsilica powder and various amounts of dispersant.

In FIG. 6 filterloss (API-standard) is shown as a function of added microsilica (dry matter), and with varying amount of dispersant (D-31LN). The density of the slurries is 1.9 g/cm3 and the temperature 70° C. The figure shows that the degree of dispersing of the small microsilica particles is of vital importance for the filterloss.

Experiments were also carried out with cement mixtures with density 2.2 g/cm³ (heavy cements) The results are shown in table 10. The mixtures contained 35% microsilica, watercontent based on amount of dry matter is 23.4%. Hematite was used as weighting agent in these mixtures. The same advantages as earlier described for cement slurries of density 1.9 g/cm³, are also valid for the heavy cements. The rheologic properties and the stability for the heavy cements are extremely good compared to corresponding "ordinary" mixtures, where just rheology is one of the main problems. Compressive strengths of 17,000 PSI are obtained after seven days.

TABLE 10

| | | | | | | | STRENGTH (PSI) | | |
|---|---|---|---|---|---|---|---|---|---|
| | | RHEOLOGY (Fann) 600-300-200-100 | PV | YP | FLUIDLOSS | THICKN. TIME (h:min) | (temp. 170° C. TIME (24 HOURS) | | |
| NO. | COLUMN 2 | (temp. 70° C.) | (cPS) | (lb/100 ft²) | (ml/30 min) | (temp. 143° C.) | 1 | 3 | 7 |
| 1 | Freshwater, 40% Hematite 7.0 D-31LN 1.78 D-110 | 94-50-37-23 | 44 | 6 | | 3:15 | 2000 | 10000 | 17000 |
| 2 | Freshwater, 40% Hematite 7.0 D-31LN 2.0 D-110 5 kg gypsum | | | | | 3:32 | | | |
| 3 | Freshwater, 40% Hematite 7.0 D-31LN | | | | | 4:05 | | | |

TABLE 10-continued $\rho = 2.2$ g/cm$^3$
Composition of the mixture:
100 kg cement, 50.91 l Emsac 460 s + 2 (1/100 kg cement)

| NO. | COLUMN 2 | RHEOLOGY (Fann) 600-300-200-100 (temp. 70° C.) | PV (cPS) | YP (lb/100 ft$^2$) | FLUIDLOSS (ml/30 min) | THICKN. TIME (h:min) (temp. 143° C.) | STRENGTH (PSI) (temp. 170° C.) TIME (24 HOURS) 1 | 3 | 7 |
|---|---|---|---|---|---|---|---|---|---|
| 4 | 2.0 D-110 Freshwater, 40% Hematite 7.0 D-31LN | | | | | 5:52 | | | |
| 5 | 2.22 D-110 Freshwater, 40% Hematite 7.0 D-31LN | 122-67-49-30 | 55 | 12 | 52 | | | | |

Table 11 shows the results from experiments carried out with a cement mixture of density 2.4 g/cm$^3$. The addition of water based on total amount of dry matter was 17.8%. A more concentrated (55%) Emsac solution was used.

TABLE 11

| Composition (1/100 kg cement) | $\rho = 2.4$ Rheology (Fann) 600-300-200-100 Temp. 90° C. | °C. | PV (cPs) | YP (lb/100 ft$^2$) |
|---|---|---|---|---|
| Cement, 6.88 l Freshwater, 100 kg Hematite 44.55 l Emsac, 12.0 l D-31LN 4.5 l D-110 | 142-76-56-33 | 90 | 60 | 10 |

It also is possible to produce cement slurries with densities up to $\rho = 3.5$ g/cm$^3$ by replacing hematite with a weighting agent of higher specific weight. By using for example small iron spheres such densities can be obtained. In table 12 there is shown the results from experiments with the addition of steel spheres to the cement.

With this invention one is able to produce a heavy weight cement slurry where strength retrogression at high temperatures is prevented. It is possible to add 30-45% microsilica into a cement-mixture with $\rho = 1.9-3.5$ g/cm$^3$. Weighting agents are added in amounts up to 100% based on the cement weight, to obtain mixtures of highest densities.

Microsilica also acts as a fluidloss preventing medium and slurries with satisfactory filterloss properties (F.L. < 100 ml/30 min.) can be produced *without* adding other agents.

The amount of microsilica for use as a fluidloss preventing medium can be 10-45% by weight based on the cement.

TABLE 12

Cement slurry of density 2,7-3,5 g/cm$^3$ at 90° C.

| COMPOSITION (1/100 kg cement) | ($^g$/cm$^3$) | RHEOLOGY (Fann) 600-300-200-100 | PV (cPs) | YP lb/100 ft$^2$ | FLUIDLOSS ml/30 min. | STRENGTH PSI 1 day | 4 days |
|---|---|---|---|---|---|---|---|
| Cement, Freshwater, 100 kg steel spheres, 44.55 l Emsac (55%), 12.0 l D-31LN, 4.5 l D-109 | 2.7 | 118-59-42-52 | 59 | 0 | 62 | | |
| Cement, Freshwater, 130 kg steel spheres, 44.55 l Emsac (55%), 12.0 l D-31LN 4.5 l D-109 | 2.8 | 122-62-43-26 | 60 | 2 | 66 | | |
| Cement, Freshwater, 200 kg steel spheres, 44.55 l Emsac (55%), 12.0 l D-31LN, 4.5 l D-109 | 3.2 | 191-99-68-41 | 92 | 7 | 60 | | |
| Cement, Freshwater, 200 kg steel spheres, 44.55 l Emsac (55%), 12.0 l D-31LN | 3.2 | | | | | 7800 | 11000 |
| Cement, Freshwater, 287 kg steel spheres, 44.55 l Emsac (55%), 15.0 l D-31LN, 4.5 D-109 | 3.5 | 174-84-59-35 | 90 | 6 | 66 | | |

*Steel spheres, diameter < 53 um (Metalpowder - TP304, = 7.9 $^g$/cm$^3$)

Addition of microsilica also favourably effects the mechanical stability of the slurry and prevents precipitation of possible added weighting agents. Cements with very high compressive strength are obtained. (For example 17,000 PSI after 7 days at $\rho = 2.2$ g/cm$^3$).)

A cement with high density also can be used as cement plug to initiate deviation drilling. Such a cement also can be used under other cementation conditions where high strength in the well is necessary, independent of temperature. It also can be used for geothermic wells.

We claim:

1. A method for production of a hydraulic high density cement slurry, which comprises mixing about 10 weight % of the total amount of cement with water to obtain a first mixture, adding to the first mixture 30–45% microsilica based on the total weight amount of cement, and a dispersant for the microsilica to obtain a second mixture, and mixing the rest of the cement with the second mixture to produce a cement slurry with a density of 1.9–3.5 g/cm$^3$.

2. The method according to claim 1, which further comprises mixing a retarder into the first mixture to control the thickening time of the slurry.

3. The method according to claim 1, which further comprises mixing a weighting agent with the second mixture.

4. The method according to claim 1, wherein the microsilica is added as a slurry to the first mixture.

* * * * *